(No Model.) 3 Sheets—Sheet 1.

A. P. MASSEY.
LOCOMOTIVE BRAKE.

No. 386,148. Patented July 17, 1888.

Witnesses:
H. G. Manning.
Elie Normand.

Inventor:
Albert P. Massey.

(No Model.) 3 Sheets—Sheet 2.

A. P. MASSEY.
LOCOMOTIVE BRAKE.

No. 386,148. Patented July 17, 1888.

Witnesses:
H. G. Manning.
Elie Normand.

Inventor:
Albert P. Massey.

N. PETERS, Photo-Lithographer, Washington, D. C.

(No Model.) 3 Sheets—Sheet 3.
A. P. MASSEY.
LOCOMOTIVE BRAKE.
No. 386,148. Patented July 17, 1888.
Fig. 8.
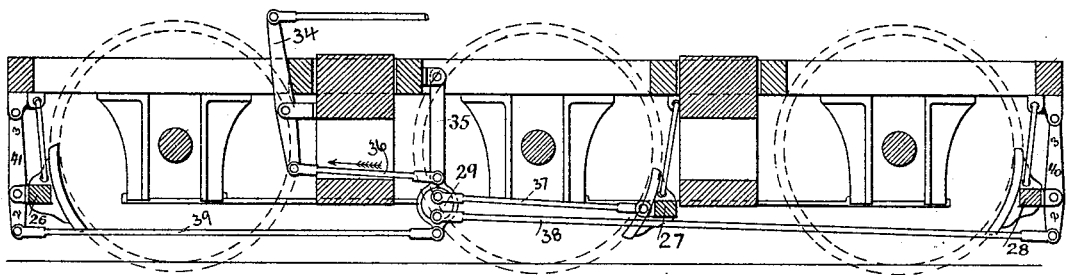
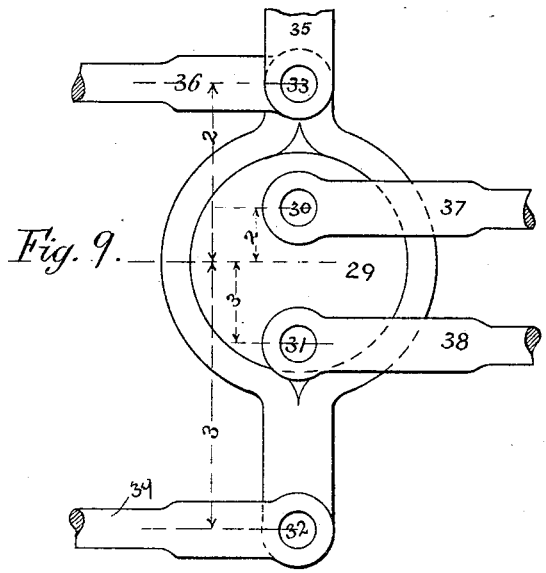
Fig. 9.
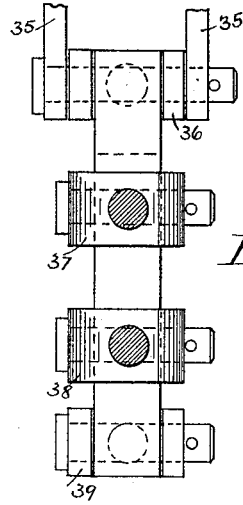
Fig. 10.
Witnesses:
H. G. Manning.
Elie Normand
Inventor:
Albert P. Massey.
N. PETERS, Photo-Lithographer, Washington, D. C.

UNITED STATES PATENT OFFICE.

ALBERT P. MASSEY, OF WATERTOWN, NEW YORK, ASSIGNOR TO THE EAMES VACUUM BRAKE COMPANY, OF SAME PLACE.

LOCOMOTIVE-BRAKE.

SPECIFICATION forming part of Letters Patent No. 386,148, dated July 17, 1888.

Application filed February 23, 1888. Serial No. 264,999. (No model.)

*To all whom it may concern:*

Be it known that I, ALBERT P. MASSEY, a citizen of the United States, residing in the city of Watertown, in the county of Jefferson and State of New York, have invented certain new and useful Improvements in Locomotive and Car Brakes, of which the following, taken in connection with the accompanying drawings, is a specification.

My invention relates to the construction of brakes in general, but has been especially devised for use as a driver-brake for locomotives having three or more pairs of coupled drivers, or car-trucks having three or more pairs of wheels.

Figure 2:
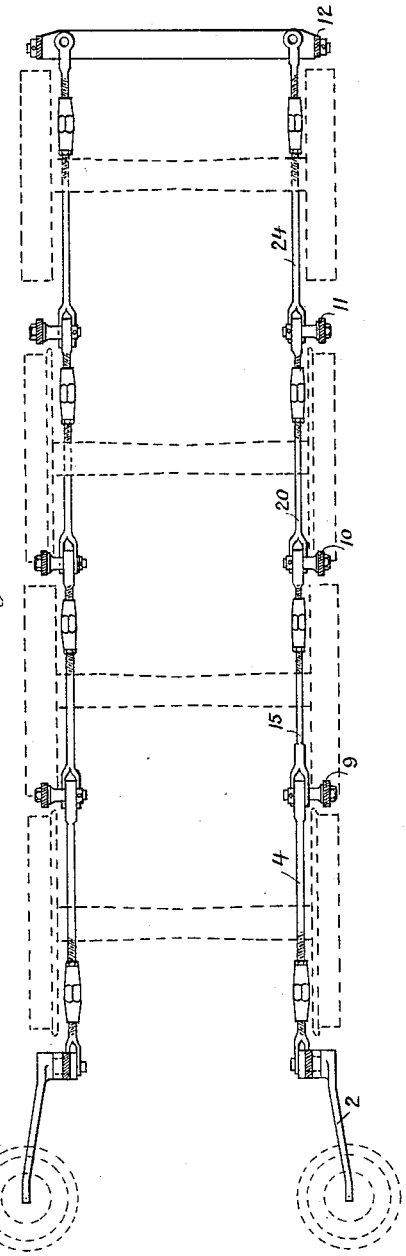
Figure 1:
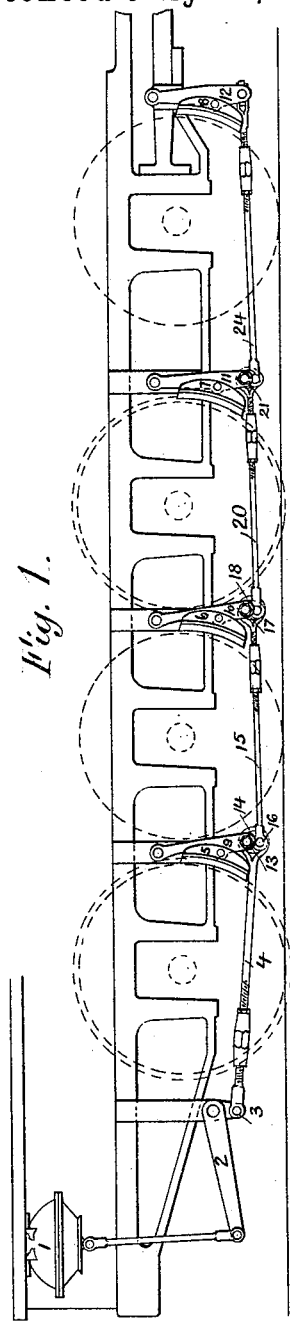
Figure 6:
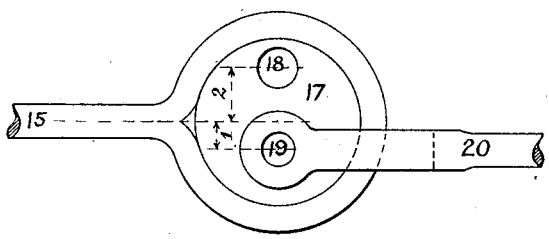
Figure 7:
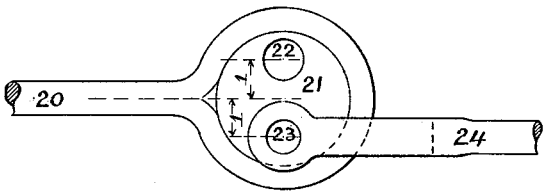
Figure 5:
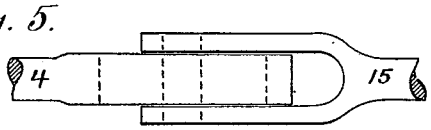
Figure 3:
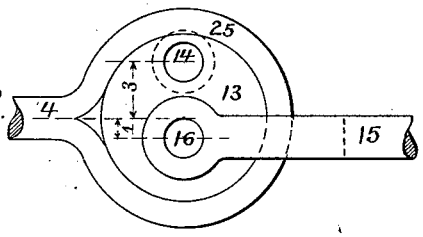
Figure 4:
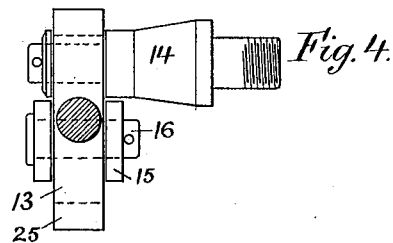

In the accompanying drawings, Figure 1 shows part of the side of a locomotive with this device attached; Fig. 2, a plan of the same. Figs. 3, 6, 7, show the three levers necessary to equalize the brake-pressure for four pairs of driving-wheels. Fig. 4 shows the method of hanging each lever to a pin that is attached to the brake-hanger. Fig. 5 is a plan of one lever and connections. Fig. 8 shows a modification of the device as applied to a six-wheeled truck. Figs. 9 and 10 are enlarged details of the same.

Like parts in the various drawings are indicated by the same figures.

Any source of power may be used to actuate the locomotive-brakes. In the drawings they are actuated by producing a vacuum in diaphragm 1, which causes the flexible disk to collapse and draw up lever 2 of bell-crank 2 3, thus producing a strong tension on pull-rod 4. This portion of the apparatus is common to many varieties of brakes, as is also the method of hanging the shoes 5 6 7 8 to the hangers 9 10 11 12.

My invention relates solely to the distribution of power or tension on pull-rod 4 equally among the shoes 5 6 7 8. The forward end of pull-rod 4 forms a strap-inclosing eccentric 13, which is hung from brake-hanger 9 by pin 14, which is rigidly attached to said brake-hanger. The bearing of pin 14 through eccentric 13 is above the center of the eccentric. (Shown plainer in Fig. 3.) Another pull-rod, 15, is attached to eccentric 13 by pin 16, whose center is below the center of the eccentric. As the eccentric is free to turn in its strap and the pins 14 and 16 are loose in their bearings, it is apparent that the stress on pull-rod 4 will be divided between the pins 14 and 16 inversely, according to the distances of their centers from the center of the eccentric 13. In this case these distances are as three to one. Therefore one-fourth of the stress will be upon pin 14 and three-fourths upon pin 16 and pull-rod 15. This puts one-fourth the stress of pull-rod 4 on the brake-hanger 9 and shoe 5, and three-fourths are transmitted through pull-rod 15 to the other three shoes, as further described.

The forward end of pull-rod 15 forms a strap inclosing eccentric 17, Fig. 6, which is hung from brake-hanger 10 by pin 18 above the center of the eccentric. Pin 19 connects eccentric 17 with pull-rod 20. The center of pin 19 is one-half as far from the center of eccentric 17 as the center of pin 18. Therefore one-third the stress on pull-rod 15 is communicated to pin 17 and thence through brake-hanger 10 to shoe 6, while two-thirds of the stress is communicated to pull-rod 20 and thence to the two remaining shoes. By the same means the stress on rod 20, Fig. 7, is distributed by eccentric 21 equally between pins 22 and 23. Pin 22 communicates the stress to brake-hanger 11 and shoe 7, while pin 23 and pull-rod 24 communicate the stress to hanger 12 and shoe 8. Thus it may be seen that by properly proportioning the distances of the centers of the inclosed pins from opposite sides of the center of the eccentrics any number of brake-shoes may be made to bear equally on their respective wheels.

Fig. 8 shows a modification of the device to suit a six-wheeled car-truck.

26 27 28 are brake-beams, one for each pair of wheels. These are hung in the usual way and need no description.

The eccentric 29, Fig. 9, has two pins, 30 and 31, located within it on opposite sides of the center. They distribute the stress that may be brought upon the eccentric in inverse proportion to the distance of their centers from the center of the eccentric. (In the drawings as two to three.) The eccentric-strap has two arms carrying the pins 32 and 33. The stress on these is also inversely proportional to the distances of the pins 32 and 33 from the center of the eccentric. Power is applied to pin 33 in the direction of the arrow either directly or through an auxiliary lever, as shown at 34. The device is suspended by links 35. If the centers 30 and 31 were at equal distances from the center of the eccentric and the centers 32 and 33 were at equal distances from the same center, it is obvious that the stress on the four rods 36 37 38 39 would be equal, and if 37 38 39 were connected directly to the brake-beams the stress on each beam would be equal to the stress on the pull-rod 36. I have purposely drawn the distances unequal in order to show its ready adaptation to any varying proportions, and also to show that the rods to the outside brake-beams can be carried below the bolsters without difficulty. To do this what are called "lazy-levers" 40 and 41 are introduced. These are drawn with the length above the brake-beam equal to two-thirds of the whole length of the lever. With this length the pressure on the brake-beams will be three when the stress on the rods 38 and 39 is two. If these same proportions are maintained in the distances of pins 32 and 33 from the center of the eccentric, and also in the distances of 30 and 31 from the same center, and the rod 37 is connected direct with the beam 27, the stress on each of the brake-beams will be equal to the stress on the pull-rod 36. Thus, assuming that the stress on the pull-rod 36 is nine, this stress, with a leverage of two to three, would give a stress on rod 39 of six and a stress on the center of the eccentric, in the opposite direction, of fifteen. The stress of six on rod 39 and a leverage of three to two at 41 would give a stress on brake-beam 26 of nine. As the opposing stress on the center of the eccentric was fifteen, and that was divided inversely, as two to three, the stress on rod 37 would be nine and on rod 38 would be six, but rod 37 connects directly with beam 27, so that the stress there would be nine. Rod 38 connects with beam 28 by the lever 40, proportioned three to two; therefore, the stress of six on the rod would result in a stress of nine on beam 28. Any other desirable combination of levers could be equalized by proper proportion of distances of pins from center of eccentric.

I am aware of various devices for equalizing the pressure upon brake shoes, but know of none where the equalizing-levers are inclosed within an eccentric-strap or enlarged stress-rod, as described, and therefore none as simple, compact, and durable.

What I claim, therefore, and desire to secure by Letters Patent, is—

1. In a brake system, an intermediate lever with its three centers of stress inclosed within a strap or jaw, combined with a pull-rod, substantially as set forth.

2. In a brake system, an eccentric inserted in the line of pull-rods, in combination with two separate bearings located within said eccentric on opposite sides of the center for the purpose of dividing the stress on the pull-rod between two or more brake-shoes, substantially as set forth.

3. In a brake system, a pair of intermediate levers revolving about the same center, wherein one lever is inclosed within the other and each forms the fulcrum for the other.

In testimony whereof I have signed my name to this specification, in the presence of two subscribing witnesses, on this 21st day of February, A. D. 1888.

ALBERT P. MASSEY.

Witnesses:
HENRY W. BOYER,
MICHAEL J. MORKIN.